US008224934B1

(12) United States Patent
Dongre et al.

(10) Patent No.: US 8,224,934 B1
(45) Date of Patent: Jul. 17, 2012

(54) RUNNING THIRD PARTY APPLICATIONS AS EMBEDDED AGENTS IN A STORAGE MANAGEMENT SERVER

(75) Inventors: Rommel Dongre, Mountain View, CA (US); Isabelle F. D. Cnudde, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 419 days.

(21) Appl. No.: 12/400,720

(22) Filed: Mar. 9, 2009

(51) Int. Cl.
*G06F 15/177* (2006.01)
*G06F 17/30* (2006.01)
(52) U.S. Cl. .......................................... 709/221; 726/21
(58) Field of Classification Search .................. 709/221; 726/21, 27; 713/189; 712/200, 227
See application file for complete search history.

(56) References Cited

U.S. PATENT DOCUMENTS

| | | | |
|---|---|---|---|
| 6,546,554 B1 * | 4/2003 | Schmidt et al. | 717/176 |
| 7,069,554 B1 * | 6/2006 | Stammers et al. | 717/178 |
| 7,127,713 B2 * | 10/2006 | Davis et al. | 717/177 |
| 7,150,041 B2 * | 12/2006 | Kishimoto et al. | 726/12 |
| 2003/0196114 A1 * | 10/2003 | Brew et al. | 713/201 |

* cited by examiner

*Primary Examiner* — Peling Shaw
*Assistant Examiner* — Thomas Richardson
(74) *Attorney, Agent, or Firm* — Perkins Coie LLP

(57) ABSTRACT

Running applications to support a storage server is made more efficient by at least establishing a sandbox to run the applications as embedded agents within the storage server. To accomplish this, in at least one embodiment, a management module of the storage server designates resources of the storage server to establish the sandbox using a role based access control mechanism. The sandbox communicates with the management module to access the resources of an operating system of the storage server to run the applications. Based on this, the need for separate external computers to run the applications is eliminated. Additionally, an administrator can control operations of the applications through the management module, thus providing the administrator a uniform interface for controlling both the storage server and the applications. The applications also utilize an existing user interface of the storage server to display logs and events to the administrator.

37 Claims, 6 Drawing Sheets

RUNNING THIRD PARTY APPLICATIONS AS EMBEDDED AGENTS IN A STORAGE MANAGEMENT SERVER

FIELD OF THE INVENTION

At least one embodiment of the present invention pertains to network storage systems, and more particularly, to a technique for running embedded applications in a storage server.

BACKGROUND

A storage management server (or simply, a "storage server") is a special purpose processing system used to store and retrieve data on behalf of one or more clients on a network. The storage server operates on behalf of one or more storage clients to store and manage data in a set of mass storage devices, such as magnetic or optical storage-based disks or tapes. The mass storage devices can be organized into one or more groups of disks (e.g., redundant array of inexpensive disks (RAID)).

FIG. 1 depicts an example of a storage system. As depicted here, a storage server can include multiple modules. The storage server 101 includes a network module 105, a data module 110, a management module 115, and a database module 120.

The network module 105 provides an interface to one or more storage clients (e.g., 125, 130). The network module 105 receives data access requests from the storage clients (e.g., read and write requests) and transmits those requests to one or more storage media (e.g., 140, 145). The network module 105 also transmits the response from the storage media to the storage clients. The network module 105, in some instances, utilizes a network 135 to enable communication between the storage clients and the storage media. The network module 105 can include functionality for translating between one or more protocols used by the storage clients and an internal protocol used by the storage server 101. Functions of the network module 105, which can include functions not mentioned here, are referred to collectively and individually as "network module functionality."

The data module 110 provides an interface to the storage media. The data module 110 can also control data layout on the storage media and respond to client-initiated read and write requests. The data module 110 can include other functionality, such as creating a backup, a mirror image or a snapshot of stored data. In some instances, the data module 110 communicates with the network module 105 to enable the storage clients to interface with the storage media. Functions of the data module 110, which can include functions not mentioned here, are referred to collectively and individually as "data module functionality."

The management module 115 provides an interface to a storage administrator to the various management and administrative functions of the storage server 101. The storage administrator can control various operations of the storage server 101 through the management module 115. Functions of the management module 115, which can include functions not mentioned here, are referred to collectively and individually as "management module functionality."

The database module 120 provides an interface to configuration information maintained of the storage server 101. The configuration information, for example, includes details on usage levels of the various storage media (e.g., 140, 145) connected to the storage server. In another example, the configuration information includes details about the various storage clients (e.g., 125, 130) connected to the storage server. Functions of the database module 120, which can include functions not mentioned here, are referred to collectively and individually as "database module functionality."

In addition to these core functionalities (e.g., management module functionality, data module functionality, etc.) provided by the storage server 101, in some instances, the storage system includes additional services or applications (e.g., antivirus services, security services, etc.) to add value and enhance the usability of the storage server 101. In some instances, these additional services or applications (hereinafter, "applications" or "third-party applications") are offered by third-party providers, i.e., providers other than the manufacturer of the storage server. Examples of such applications include security management applications, antivirus applications, third-party storage management applications, etc.

In conventional storage systems, these applications are offered by running the applications (e.g., 155, 165) on one or more "external" computers (e.g., 150, 160). The term "external," as used herein, indicates that the computers running the applications are not part of the storage server 101. The external computers do not share or utilize hardware resources of the storage server 101. The external computers, in some instances, communicate with the storage server 101 through the network 135.

Various problems are associated with running the applications on external computers. For example, in some instances, the applications access the various modules of the storage server 101 to collect information about, for example, the usage statistics of the storage media. Because the applications are on external computers, they interface with the storage server 101 through the network 135. This introduces latency during the operation of the applications.

In another example, the overall cost of the storage system is higher owing to the use of external computers to run the applications. In some instances, the storage administrator has to set up separate interfaces for each of the applications, in order to enable them to communicate with the storage server 101. This further increases the overhead cost and operational expenses incurred in maintaining the external computers.

In another example, in addition to monitoring and controlling the functionality of the storage server 101 through the management module 115, the storage administrator has to access each external computer to manage the various applications. This further increases the operational overhead involved in maintaining the storage system.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
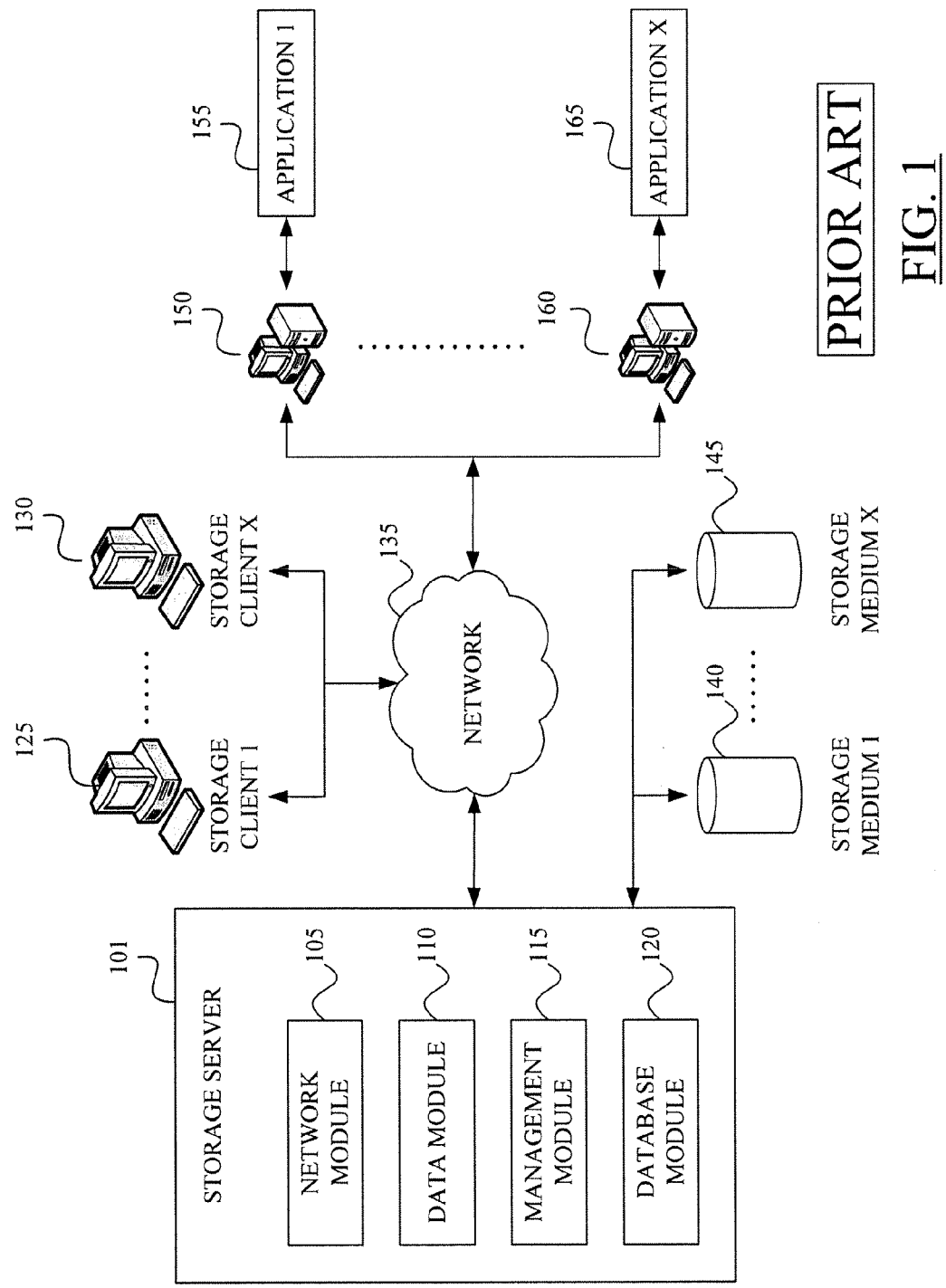
FIG. 1 depicts an example of a prior art storage system.

A technique for embedding applications within a storage server is described. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Running applications to support a storage server is made more efficient by at least establishing a sandbox to run the applications as embedded agents within the storage server. To accomplish this, in at least one embodiment, a management module of the storage server designates resources of the storage server to establish the sandbox using a role based access control mechanism of the storage server. The sandbox communicates with the management module to access the resources of an operating system of the storage server to run the applications. Based on this, the need for separate external computers to run the applications is eliminated. Additionally, an administrator can control operations of the applications through the management module, thus providing the administrator a uniform interface for controlling both the storage server and the applications. The applications also utilize an existing user interface of the storage server to display logs and events to the administrator.

In one embodiment of the technique introduced here, the various applications are run as embedded agents within the storage server. The applications utilize the resources of the storage server for their operation. To accomplish this, in some instances, the management module of the storage server establishes a "sandbox" to run the applications.

A sandbox is a mechanism provided by a host computer to safely run one or more applications. In some instances, the sandbox provides a controlled set of resources for the applications to run in. In one example, the sandbox utilizes the host computer's scratch space (i.e., temporary storage space) to run the applications. In other examples, the sandbox restricts or controls the application's network access, ability to inspect the host computer, read from the host computer's input devices, etc.

In some instances, the sandbox also enables the guest program to be run in a "jail" mode. A jail is a set of resource limits imposed on the guest program by the kernel of the host computer's operating system. The limits can include I/O bandwidth limits, disk quotas, network access restrictions, etc.

In one embodiment of the technique introduced here, the management module establishes a sandbox to run the various applications. Examples of such applications include security management applications, antivirus applications, third-party storage management applications, etc. The management module identifies specific resources of the storage server (e.g., a temporary storage area allocated to the management module) and establishes a sandbox using the specific resources.

The various applications are installed or copied into the location identified by the management module (i.e., into the sandbox). These applications are then run as embedded agents within the storage server. In some embodiments, the sandbox interfaces with the management module to gain access to resources of the operating system of the storage server. The sandbox utilizes these resources to run the various applications as embedded agents. In some instances, the management module controls the amount of the resources utilized by the sandbox.

By running the applications as embedded agents within the storage server, the need for external computers to run the application is eliminated. The applications utilize existing resources of the storage server, thereby reducing the cost involved in establishing and maintaining the external computers.

Additionally, because the applications are run as embedded agents within the storage server, a storage administrator can perform administrative and management operations on the applications through the management module. Therefore, the management module provides a common and uniform interface to the storage administrator.

Also, the sandbox provides a direct interface between the applications and the storage server. Therefore, the latency effects due to communication between the storage server and external computers are eliminated (for purposes of running the applications), allowing the applications to operate with higher efficiency.

Figure 2:
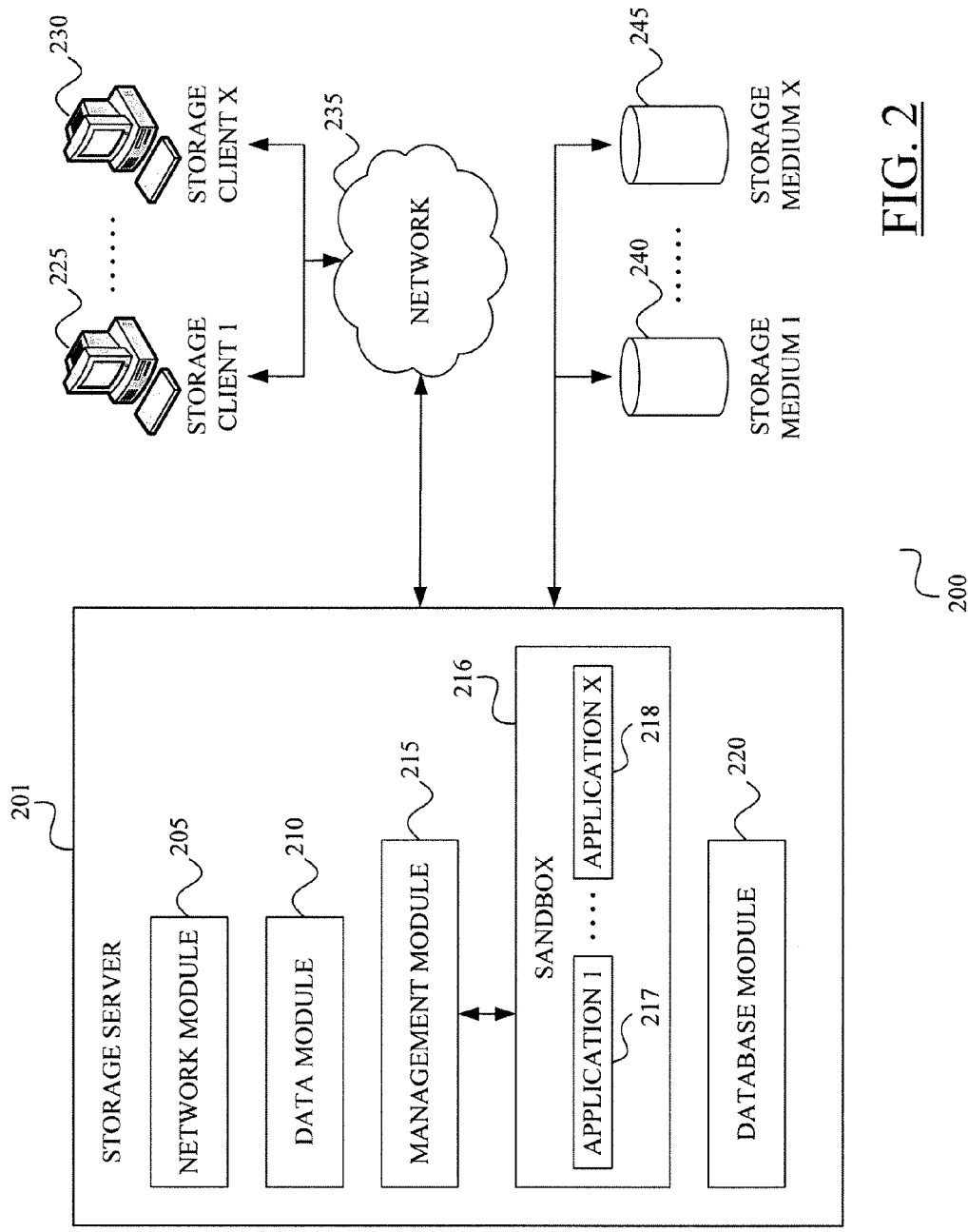
FIG. 2 illustrates one embodiment of a storage system utilizing a sandbox to run applications as embedded agents.

FIG. 2 illustrates one embodiment of a storage system 200. Here, 201 is an embodiment of the storage server that illustrates the technique introduced herein. The storage server 201 includes a network module 205, a data module 210, a management module 215, and a database module 220. As discussed above, one of the functions of the management module 215 is to allow a storage administrator to control administrative and management functions of the storage server 201. The management module 215 also provides the storage administrator an interface to the storage server 201.

The network module 205 provides an interface to one or more storage clients (e.g., 225, 230). The network module 205 receives data access requests from the storage clients (e.g., read and write requests) and transmits those requests to one or more storage media (e.g., 240, 245). The network module 205 also transmits the response from the storage media to the storage clients. The network module utilizes a network 235 to interface with the storage clients. Additionally, the data module 210 provides an interface to the storage media. In one embodiment, the data module 210 can also control data layout on the storage media and respond to client-initiated read and write requests.

In one embodiment of the technique described herein, the management module 215 establishes a sandbox 216 to run various applications (e.g., 217, 218). The sandbox is a mechanism to run the various applications as embedded agents within the storage server 201. The sandbox 216 provides a controlled set of the storage server's 201 resources for the various applications to run.

In one embodiment, the management module 215 establishes a sandbox by assigning specific resources of the storage server 201 for use by the sandbox 216. For example, the management module 201 assigns a specific part of the storage server's 201 memory (e.g., a specific address range of the storage server's memory, a temporary or cache storage area of the storage server's memory, etc.) for use as the sandbox 216. A storage administrator can then install or copy over the various applications into the sandbox 216. Examples of such applications include security management applications, antivirus applications, third-party storage management applications, etc.

In one embodiment, the sandbox is implemented as a plurality of enforcements. The enforcements include, for example, the amount of resources (e.g., memory, processor, network bandwidth, etc.) that the sandbox can utilize at any given moment. In some instances, the enforcements represent the upper limit of such resources that the sandbox can utilize to run one or more applications. In other words, the enforcements constrain the operation of the application(s) within a controlled set of such resources.

In some embodiments, the management module of the storage management server establishes the plurality of enforcements using a role based access control (RBAC) mechanism. An RBAC, as described herein, refers to a mechanism that restricts access to system resources to authorized users based on their permission or authority level. The RBAC uses "roles" for various job functions. Various roles can be implemented within, for example, the storage management server, with each role having different sets of permissions and access levels.

The permissions to perform certain operations within the storage management server are assigned to specific roles. For example, a primary application running within the management server may have an "administrative" role, allowing the primary application to access all resources of the storage management server without any restrictions. On the other hand, for example, a third-party application may be run in a "sandbox role" level.

Such a sandbox role is established by incorporating the plurality of enforcements previously identified for establishing the sandbox. Examples of such enforcements include a restriction on a quantity of data that the third-party applications may store in the local storage unit of the storage management server, a restriction on the amount of system memory that the third-party applications may access at any given time, a restriction on a number of processor cycles that the third-party applications may consume at a given time, a restriction on the maximum priority that may be allocated to the process thread of the third-party application, etc. Other restrictions to the operation of the third-party applications, as understood by a person of ordinary skill in the art, are also suitable as examples of the enforcements discussed herein.

In one embodiment, the sandbox role is established by encompassing, for example, one or more access permissions to define each of the enforcements. For example, a first permission level may define that the third-party applications have permission to store up until 10 MB of data in the local storage unit. In some instances, the sandbox role can be configured and changed at will by a network administrator (e.g., changing the limit to the amount of data that the applications running in the sandbox can store in a local storage location, etc.) by accessing the sandbox settings through the management module.

By establishing the sandbox with a specific role in the RBAC mechanism, the sandbox is inherently built with a set of controls and constraints to prevent the overall amount of resources consumed by the sandbox to be kept under a given level. When running the third-party applications, the RBAC mechanism uses the one or more access permissions defined in the specific role to implement the corresponding enforcements. Establishing the specific role precludes the need for an administrator to define a limit for each of the resources and monitor them separately.

In some instances, the sandbox 216 communicates with the management module 215 to access resources of the underlying operating system of the storage server 201. The sandbox utilizes these resources to run the various applications as embedded agents. In one example, the sandbox 216 uses application programming interface (API) calls of the RBAC mechanism to communicate with the management module 215 to access the resources of the underlying operating system. The sandbox 216 then runs the various applications utilizing the resources 201 allocated by the underlying operating system.

Because the applications are embedded in the storage server 201, each application, for example, runs as a service offered by the storage server 201. For example, when an antivirus application is installed within the sandbox 216, the storage server, in effect, offers an antivirus service. The antivirus service, in some instances, utilizes the network module functionality to monitor and perform antivirus operations on each of the storage clients (e.g., 225, 230) and the storage media (e.g., 240, 245).

In one embodiment, the sandbox 216 runs the various applications in a jail mode utilizing the RBAC mechanism. As discussed above, the management module 215 allocates a specific amount of resources to the sandbox 216. In the jail mode, the management module 215 places a predetermined limit on each of the resources allocated to the sandbox 216. For example, in some instances, the management module 215 limits the amount of memory allocated to the sandbox to a certain percentage. In another example, the management module 215 limits the number of processor cycles allocated to the sandbox to a certain percentage. In some embodiments, the storage administrator can assign such limits through a user interface of the management module 215.

In one embodiment, each application is initialized within the sandbox 216 in a jail mode. Here, the management module 215 limits the resources allocated to each of the individual applications based on predetermined conditions. For example, the management module 215 could limit the memory allocated to a first application to a certain percentage of the total memory allocated to the sandbox 216. In such an example, when the memory usage of the first application reaches a certain percentage of the memory allocated to the sandbox 216, the management module 215 prevents the first application from accessing any additional memory.

In some instances, when the first application seeks to utilize more than the predetermined amount of, for example, the memory allocated to the first application, the management module 215 determines whether there is any "remainder resource" in the sandbox 216. The remainder resource, as described herein, is the difference between an overall amount of resources allocated to the sandbox 216 and the total amount of the resources utilized by all the applications running within the sandbox 216 at a given moment. If the management module 215 determines that a remainder resource resists, or in this instance, a remainder memory exists, it allows the first application to access more than the predetermined amount of memory (to the extent of the remainder memory of the sandbox 216).

In one embodiment, the management module 215 allocates resources to the various applications running in the sandbox 216 based on a priority assigned by a storage administrator. For example, in some instances, the storage administrator assigns a higher priority to a first application and a lower priority to a second application running in the sandbox 216. The management module 215, as discussed above, limits or restricts the overall amount of resources utilized by the applications running in the sandbox to a predetermined value. Consider an instance where the first application and the second application are simultaneously running, and the overall amount of resources utilized by the applications running in the sandbox reaches the predetermined value. In such an instance, the management module 215 allocates a higher amount of the resources to the first application, which has the higher priority. In such an event, at least a part of the resources allocated to the second application (with the lower priority) are instead redirected to the first application.

Figure 3:
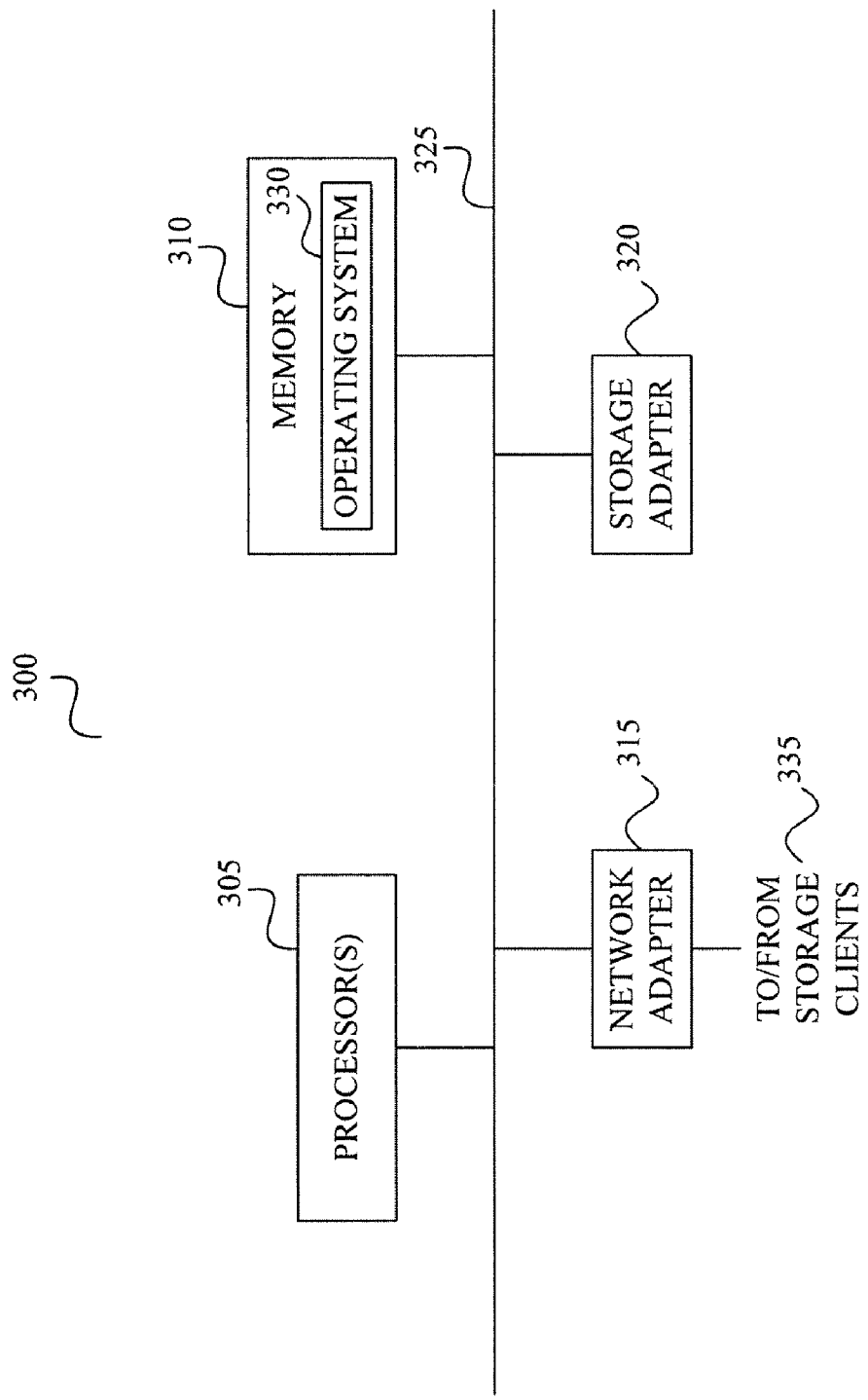
FIG. 3 is a high-level block diagram showing an example of the architecture for a computer system.

FIG. 3 is a high-level block diagram showing an example of the architecture for a computer system 300 that can be utilized to implement, for example, a storage server 201. In FIG. 3, the computer system 300 includes one or more processors 305 and memory 310 connected via an interconnect 325. The interconnect 325 is an abstraction that represents any one or more separate physical buses, point-to-point connections, or both connected by appropriate bridges, adapters, or controllers. The interconnect 325, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 305 may include central processing units (CPUs) to control the overall operation of, for example, the host computer. In certain embodiments, the processor(s) 305 accomplish this by executing software or firmware stored in memory 310. The processor(s) 305 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 310 is or includes the main memory of the computer system 300. The memory 310 represents any form of random access memory (RAM), read-only memory (ROM), flash memory (as discussed above), or the like, or a combination of such devices. In use, the memory 310 may contain, among other things, a set of machine instructions which, when executed by processor 305, causes the processor 305 to perform operations to implement embodiments of the present invention. The memory 310, also includes the operating system 330 of the storage server, which includes the network module 205, data module 210, etc.

Also connected to the processor(s) 305 through the interconnect 325 are a network adapter 315 and a storage adapter 320. The network adapter 315 provides the computer system 300 with the ability to communicate with remote devices, such as storage clients 335, over the interconnect 325 and can be, for example, an Ethernet adapter or Fibre Channel adapter. The storage adapter 315 allows the computer system 300 to access the storage media (e.g., 240) and can be, for example, a Fibre Channel adapter or a SCSI adapter.

Figure 4:
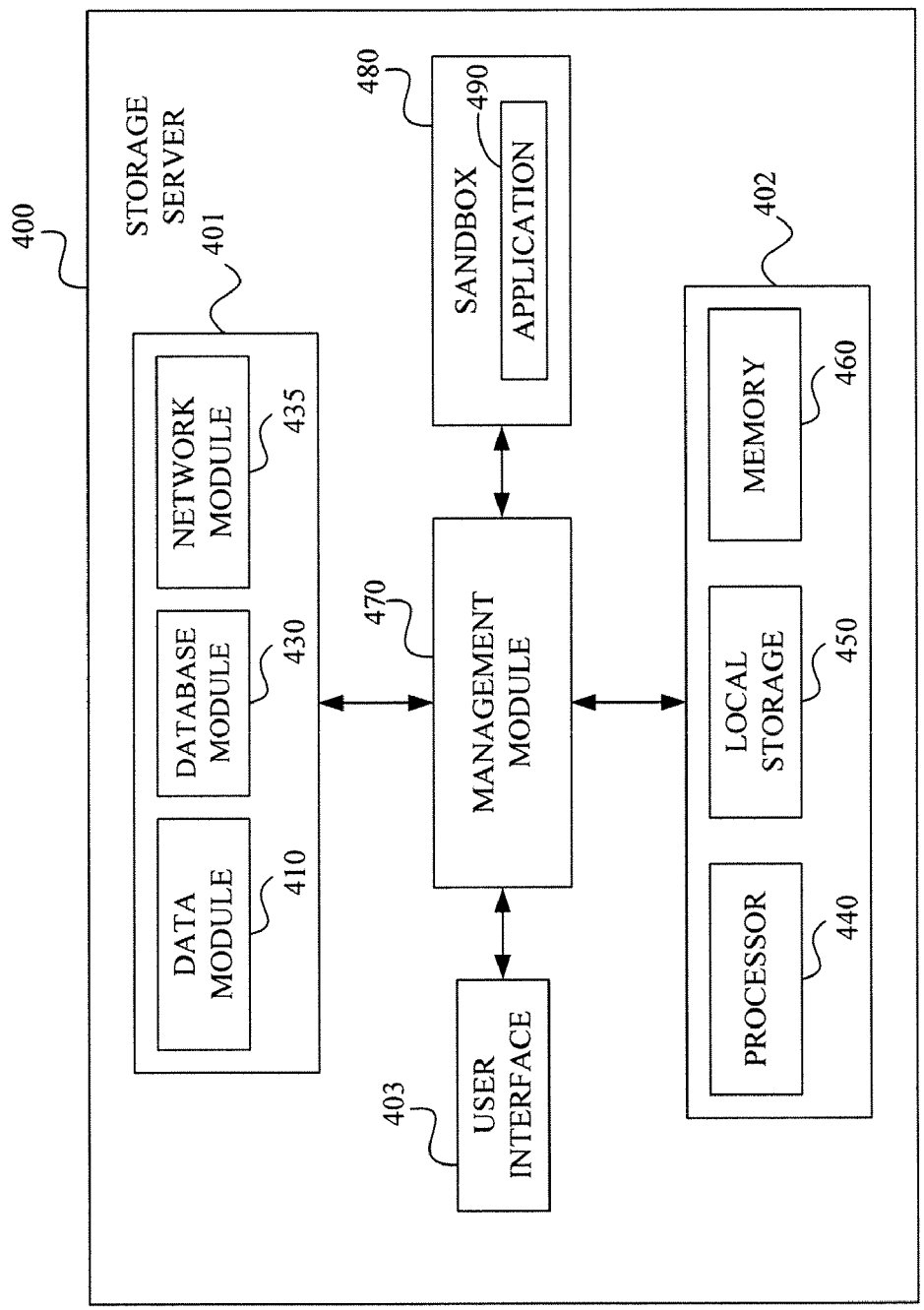
FIG. 4 depicts an embodiment of the storage server illustrating how a sandbox communicates with the various resources of the storage server.

For purpose of further illustration, it is useful to consider the techniques explained herein as it applies to a single application installed within a sandbox. FIG. 4, discussed below, illustrates such an embodiment. Of course, however, it should be noted that the techniques introduced here apply to sandboxes that contain multiple applications.

FIG. 4 depicts an embodiment of the storage server 400 illustrating how a sandbox 480 communicates with the various resources of the storage server 400. In one embodiment, as discussed above, the management module 470 of the storage server 400 establishes and controls resources allocated to a sandbox 480. In some instances, a storage administrator can then install the application 490 within the sandbox 480, after which the sandbox 480 runs the application 490 as an embedded agent of the storage server 400. In other instances, the manufacturer of the storage server 400 installs the application 490 within the sandbox 480 before delivering the storage server 400 to the storage administrator. In some instances, the sandbox 480 communicates with the management module 470 to gain access to resources of the storage server 400.

FIG. 4 illustrates the various resources and functional modules that the sandbox 480 accesses through the management module 470. 402 is an exemplary set of resources that the sandbox accesses through the management module 470. Here, the resources include one or more processors 440 of the storage server, a local storage 450 in the storage server, the storage server's memory 460, etc. In some embodiments, as discussed above, the management module 470 restricts or limits the amount of resources 402 the application 490 in the sandbox 480 can utilize at any given time.

In some instances, the application 490 generates log files indicating, for example, performance statistics of the application 490. The application 490 accesses the local storage 450 through the management module to store the log files. The management module, in some instances, restricts the amount of local storage 450 that the application 490 can use for storing log files.

In addition to access to the storage server's resources, the management module also enables the application 490 in the sandbox 480 to access the functional modules 401 of the storage server 400. In some instances, the application 490 accesses the database module 410 to retrieve, for example, configuration information associated with the overall storage system. The configuration information contains, for example, information about the various storage media and the storage clients connected to the storage server 400. In some instances, the management module 470 places a restriction on the amount or type of configuration information that the application 490 can access through the database module 430.

In some instances, the application 490 communicates with the data module 420 to access, for example, system logs associated with the storage server 400. The system logs maintain, for example, information about failure events, system events, SNMP traps, etc. In other instances, the application 490 communicates any associated events (e.g., failure events associated with the application, etc.) to the management module 470. In some instances, the management module 470 places a restriction on the amount or type of system logs that the application 490 can access through the data module 410.

Similarly, in one embodiment, the application 490 communicates with the network module 435 to access, for example, the storage clients connected to the storage server 400. In some instances, the management module 470 places a restriction on the network access of the application 490. In one example, the management module 470 allows the application 490 to access the internet through the network module 435, but restricts the application 490 from accessing any storage media connected to the storage server 400.

In one embodiment, the application 490 has access to a user interface 403 of the storage server 400 through the management module 470. The user interface 403 enables a storage administrator to perform administrative and management functions of the storage server 400 through the management module 470. By integrating the application 490 within the storage server 400, the storage administrator can now perform administrative and management functions on the application 490 through the user interface 403. The storage administrator can thus use a centralized interface to perform all performance and administrative functions both on the storage server 400 and the application 490.

Figure 5:
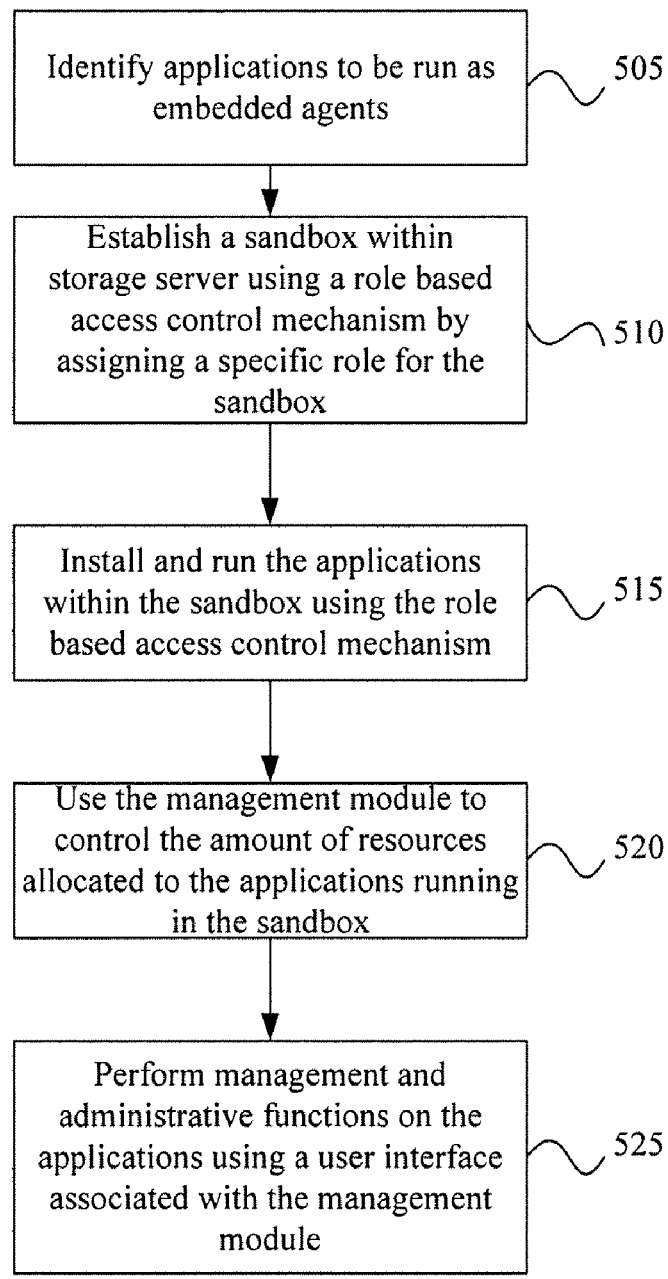
FIG. 5 is a flow diagram explaining a process for running embedded agents within a storage server.

FIG. 5 is a flow diagram explaining a process for running embedded agents within a storage server. The process starts at 505, where, for example, a storage administrator identifies one or more applications that can be embedded within the storage server. Examples of such applications include security management software, antivirus software, etc. At 510, the management module establishes a sandbox within the storage server. In some instances, the management module designates, for example, a certain part of the storage server's memory to establish the sandbox.

At 515, the storage administrator or the manufacturer of the storage server installs the applications within the sandbox. The applications communicate with the management module to gain access to the resources of the operating system of the storage server. By utilizing the resources, the applications run as embedded agents within the storage server. In some instances, the management module restricts or limits the amount of resources utilized by the applications, as indicated in 520. At 525, the storage administrator is able to perform administrative and management functions on the applications using a user interface associated with the management module of the storage server.

Figure 6:
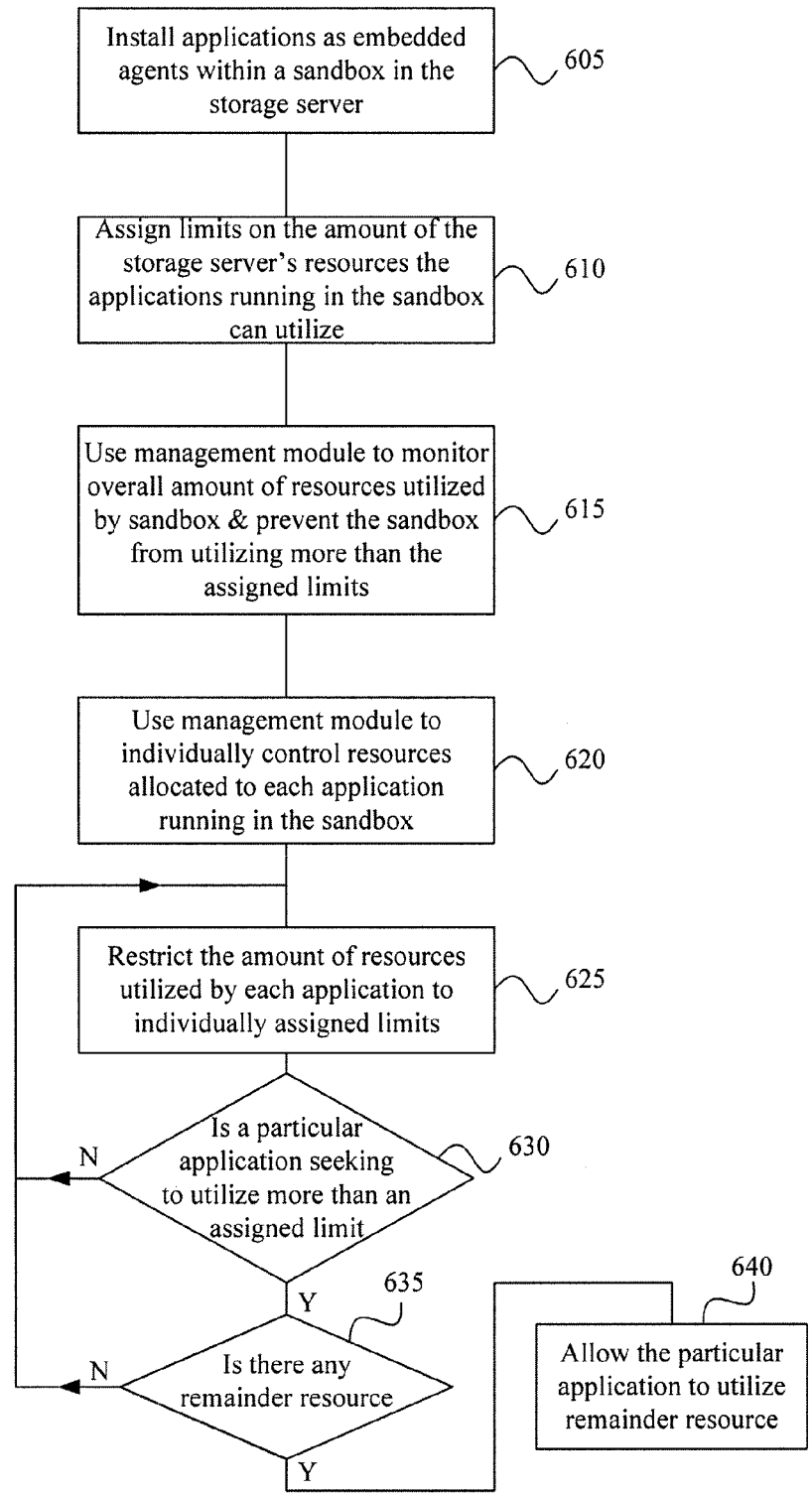
FIG. 6 is a flow diagram illustrating how the applications are run in a controlled mode.

FIG. 6 is a flow diagram illustrating how the applications are run in a controlled mode in the sandbox. The process starts at 605, where the various applications are installed within the sandbox of the storage server. At 610, the management module assigns limits to the amount of the storage server's resources the sandbox can utilize. For example, the management module may place a limit that the sandbox cannot utilize more than 10% of the storage server's memory. At 615, the management module monitors the overall amount of resources utilized by the sandbox and prevents the sandbox from utilizing more than the assigned limits.

In some instances, as indicated at 620, the management module places further limits to individually control the amount of resources utilized by each application. At 625, the management module monitors the resources utilized by each application and prevents the applications from exceeding the individual limits. At 630, the management module detects that a particular application is seeking to utilize more than a previously assigned limit of a resource. In such a case, as indicated in 635, the management module determines whether there is a remainder amount of resources within the sandbox that the particular application could utilize. If the remainder amount of resources exists, as indicated in 640, the management module allows the particular application to utilize more than the assigned amount of resources (to the extent of the remainder amount of resources).

Thus, the technique introduced here makes it possible to run applications within a storage server by establishing a sandbox within the storage server to run the applications. The technique introduced here allows the applications to be run without the requirement for any additional computers to be set up external to the storage server. The technique also allows an administrator to centrally control and monitor the applications through the management module of the storage server.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that stores information in a form accessible by a machine (e.g., a computer, network device, personal digital assistant (PDA), any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims.

Accordingly, the specification and drawings are to be regarded in an illustrative sense rather than a restrictive sense.

What is claimed is:

1. A storage management server comprising:
a set of one or more processors to execute operations of a management module, a network module and a data module, wherein:
the storage management server is a special-purpose processing system configured to store, manage, and retrieve data in a set of mass storage devices on behalf of one or more network storage clients, the network module is configured to enable the storage management server to communicate with the one or more network storage clients, and the data module is configured to manage data retrieval and storage in the set of mass storage devices;
the management module is configured to establish a sandbox to operate a third-party application as an embedded agent within the storage management server, wherein the management module is configured to establish the sandbox by implementing a plurality of enforcements to constrain operation of the third-party application within a controlled set of the storage management server's resources, and wherein the management module is configured to implement the plurality of enforcements by establishing a specific role for the sandbox in a role based access control mechanism of the storage management server;
the sandbox uses the role based access control mechanism to enable the third-party application to communicate with the management module, wherein the third-party application is entirely enabled and operable from within the storage management server as a native service offered from within the storage management server independent of and without need for communication with any third-party server for operation of the third-party application, and wherein the third-party application is configured to provide a service related to the providing of data access services by the storage management server to the one or more network storage clients; and
the management module provides the third-party application restricted access to an operating system of the storage management server to enable operation of the third-party application as an embedded agent within the storage management server; and
a memory coupled to the one or more processors to store the operating system of the storage management server.

2. The storage management server of claim 1, wherein, each of the plurality of enforcements corresponds to a particular restriction placed to constrain the operation of the third-party application.

3. The storage management server of claim 2, wherein, the particular restriction includes one of:
a restriction on a quantity of data that the third-party application may store in a local storage of the storage management server;
a restriction on an amount of system memory that may be used by the third-party application;
a restriction on a number of processor cycles that may be used by the third-party application; or
a restriction on a priority of a process thread corresponding to the third-party application.

4. The storage management server of claim 1, wherein, the specific role encompasses a plurality of access permissions assigned to the third-party application, each of the plurality of permission levels defining a particular enforcement of the plurality of enforcements.

5. The storage management server of claim 4, wherein, the role based access control mechanism utilizes the plurality of access permissions encompassed in the specific role to implement each of the plurality of enforcements to constrain the operation of the third-party application.

6. The storage management server of claim 1, wherein the sandbox enables an interface to be established between the storage management server and the third-party application without requiring an additional computer to be used to execute the third-party application.

7. The storage management server of claim 1, wherein the management module is configured to allow an administrator to control operation of the storage management server.

8. The storage management server of claim 1, wherein running the third-party application as an embedded agent within the storage management server enables an administrator to control operations of the application through the management module of the storage management server.

9. The storage management server of claim 8, wherein running the third-party application as an embedded agent within the storage management server enables the administrator to control the operations of the third-party application without requiring the administrator to access a different computer.

10. The storage management server of claim 1, wherein the management module enables the third-party application to access a database module of the storage management server, wherein the database module includes configuration information of a plurality of storage clients and a plurality of storage media connected to the storage management server.

11. The storage management server of claim 10, wherein the management module uses the role based access control mechanism to enable an administrator to control the third-party application's access to the database module.

12. The storage management server of claim 1, wherein during operation, the management module monitors a first resource of the storage management server's resources utilized by the third-party application.

13. The storage management server of claim 12, wherein the management module prevents the third-party application from utilizing more than a predetermined amount of the first resource.

14. The storage management server of claim 12, wherein the first resource includes at least one of a local storage, a processor, a system memory, or a local memory.

15. A method of operating a third-party application within a storage management server, the method comprising:
the storage management server including a network module, a data module, and a management module, the storage management server configured to store, manage, and retrieve data in a set of mass storage devices on behalf of one or more network storage clients, wherein the network module is configured to enable the storage management server to communicate with the one or more network storage clients, and the data module is configured to manage data retrieval and storage in the set of mass storage devices;
establishing a sandbox by the management module within the storage management server by implementing a plurality of enforcements to constrain operation of the third-party application within a controlled set of the storage management server's resources, wherein the management module of the storage management server implements the plurality of enforcements by establishing a specific role for the sandbox in a role based access control mechanism of the storage management server;
operating the third-party application within the sandbox, wherein the sandbox uses the role based access control mechanism to enable the third-party application to communicate with the management module, wherein the third-party application is a entirely enabled and operable from within the storage management server as a native service offered from within the storage management server independent of and without need for communication with any third-party servers for operation of the third-party application, and wherein the third-party application is configured to provide a service related to the providing of data access services by the storage management server to the one or more network storage clients; and
providing, using the management module, restricted access to an operating system of the storage management server to operate the third-party application as an embedded agent within the storage management server.

16. The method of claim 15, wherein the executing the third-party application within the sandbox enables the third-party application to be run without requiring an additional computer.

17. The method of claim 15, wherein a user interface of the management module enables an administrator to control operation of the storage management server.

18. The method of claim 17, further comprising:
enabling an administrator to control operation of the third-party application through the management module of the storage management server, without requiring the administrator to access a different computer to access the application.

19. The method of claim 17, further comprising:
monitoring, using the management module, a plurality of resources utilized by the third-party application;
establishing, through the management module, a limit for each of the plurality of resources for the third-party application; and
preventing the third-party application from exceeding the limit for each of the plurality of resources.

20. The method of claim 19, wherein the plurality of resources include a local storage, a processor, a system memory, or a local memory.

21. The method of claim 15, further comprising:
providing, to the third-party application running within the sandbox, access to a database module of the storage management server; and
limiting access of the third-party application to the database module based on a specific condition.

22. The method of claim 21, further comprising:
providing an interface for the third-party application to retrieve information from the database module.

23. The method of claim 15, further comprising:
providing a logging capability to the third-party application, wherein the third-party application accesses a local storage of the storage management server to save log files generated using the logging capability.

24. The method of claim 15, further comprising:
handling events generated by the third-party application using the management module of the storage management server.

25. The method of claim 23, wherein an administrator receives events associated with the third-party application through a user interface of the storage management server.

26. A computer implemented method for protecting data in a storage management server, the method comprising:

the storage management server including a network module, a data module, and a management module, the storage management server configured to store, manage, and retrieve data in a set of mass storage devices on behalf of one or more network storage clients, wherein the network module is configured to enable the storage management server to communicate with the one or more network storage clients, and the data module is configured to manage data retrieval and storage in the set of mass storage devices;

establishing, using the management module of the storage management server, a sandbox to operate a plurality of third-party applications within the storage management server, wherein the management module establishes the sandbox by implementing a plurality of enforcements to constrain operation of the plurality of third-party applications within a controlled set of the storage management server's resources;

operating the plurality of third-party applications as embedded agents in the sandbox, wherein the sandbox uses a role based access control mechanism of the storage management server to enable the plurality of third-party applications to communicate with the management module, wherein the third-party applications are entirely enabled and operable from within the storage management server as a native service offered from within the storage management server independent of and without need for communication with any third-party servers for operation of the third-party application, and wherein the third-party applications are configured to provide services related to the providing of data access services by the storage management server to the one or more network storage clients; and providing, using the management module, restricted access to an operating system of the storage management server to operate each of the plurality of third-party applications as embedded agents within the storage management server.

27. The method of claim 26, wherein the management module implements the plurality of enforcements by establishing a specific role for the sandbox in the role based access control mechanism of the storage management server.

28. The method of claim 27, further comprising:
monitoring, using the management module, a plurality of resources utilized by a particular application of the plurality of third-party applications;
establishing, through the management module, a limit for each of the plurality of resources for the particular application; and
preventing the particular application from exceeding the limit for each of the plurality of resources.

29. The method of claim 28, wherein the plurality of resources include a local storage, a processor, a system memory, or a local memory.

30. The method of claim 27, further comprising:
establishing, using the management module, a priority of operation for each of the plurality of third-party applications; and
allocating the plurality of resources to each of the plurality of third-party applications based on the priority of operation.

31. The method of claim 27, further comprising:
determining, using the management module, whether the particular application is seeking to utilize more than a predetermined limit of a first resource from the plurality of resources;
identifying, using the management module, a remainder resource associated with the first resource; and
permitting the particular application to utilize the remainder resource.

32. The method of claim 26, wherein, each of the plurality of enforcements corresponds to a particular restriction placed to constrain the operation of the plurality of third-party applications.

33. The storage management server of claim 32, wherein, the particular restriction includes one of:
a restriction on a quantity of data that the plurality of third-party applications may share in a local storage of the storage management server;
a restriction on an amount of system memory that may be used by the plurality of third-party applications;
a restriction on a number of processor cycles that may be used by the plurality of third-party applications; or
a restriction on a priority of a process thread corresponding to the plurality of third-party applications.

34. The method of claim 26, wherein, the management module implements the plurality of enforcements by establishing a specific role for the sandbox in the role based access control mechanism of the storage management server.

35. The method of claim 34, wherein, the specific role encompasses a plurality of access permissions assigned to the plurality of third-party applications, each of the plurality of permission levels defining a particular enforcement of the plurality of enforcements.

36. The method of claim 35, wherein, the role based access control mechanism utilizes the plurality of access permissions encompassed in the specific role to implement each of the plurality of enforcements to constrain the operation of the plurality of third-party applications.

37. A storage management server for protecting data, the storage management server comprising:
a set of one or more processors to execute operations of the storage management server, comprising a management module, a network module, and a data module, wherein:
the storage management server is configured to store, manage, and retrieve data in a set of mass storage devices on behalf of one or more network storage clients, the network module is configured to enable the storage management server to communicate with the one or more network storage clients, and the data module is configured to manage data retrieval and storage in the set of mass storage devices;
the storage management server establishes a sandbox to operate a plurality of third-party applications by implementing a plurality of enforcements to constrain operation of the plurality of third-party applications within a controlled set of the storage management server's resources;
the storage management server implements the plurality of enforcements by establishing a specific role for the sandbox in a role based access control mechanism of the storage management server, wherein the third-party applications are entirely enabled and operable from within the storage management server as a native service offered from within the storage management server independent of and without need for communication with any third-party servers for operation of the third-party application, and wherein the third-party applications are configured to provide services related to the providing of data access services by the storage management server to the one or more network storage clients;

the sandbox uses the role based access control mechanism to constrain operation of each of the plurality of third-party applications within the controlled set of the storage management's resources; and the sandbox enables the plurality of third-party applications to be operated within the storage management server without requiring use of an additional computer to operate each of the plurality of applications; and a memory coupled to the one or more processors to store the plurality of applications.

* * * * *